United States Patent

Brault et al.

[15] 3,704,946

[45] Dec. 5, 1972

[54] MICROCIRCUIT ART GENERATING MEANS

[72] Inventors: Andre R. Brault, St. James, N.Y. 11780; Anwar K. Chitayat, Plainview, N.Y. 13137; Ronald C. M. Beeh, Brentwood, L.I., N.Y. 11717

[73] Assignee: Said Beech Assor to OPT Omechanisms Inc., Plainview, N.Y.

[22] Filed: Feb. 20, 1969

[21] Appl. No.: 812,943

[52] U.S. Cl. ........................355/46, 95/4.5 R, 355/53

[51] Int. Cl. ........................G03b 27/46, G03b 27/50

[58] Field of Search .............355/46, 53, 43; 95/4.5 R

[56] References Cited

UNITED STATES PATENTS

| | | | |
|---|---|---|---|
| 3,494,695 | 2/1970 | Sollima et al. | 355/53 |
| 3,498,711 | 3/1970 | Ables et al. | 355/53 |
| 3,458,253 | 7/1969 | Hansen | 355/43 |

*Primary Examiner*—Samuel S. Matthews
*Assistant Examiner*—Richard A. Wintercorn
*Attorney*—James P. Malone

[57] ABSTRACT

A machine to generate the art work in making photomasks for microcircuits. A photoplate is mounted on a precision X and Y coordinate table underneath a microflash camera having a master reticle holder holding a master reticle plate. The master plate has a plurality of apertures of different sizes, shapes and configurations. Lines and designs are traced on the receiving plate by scanning it and flashing the camera lamp through the aperture.

The positions of the X and Y table is measured by interferometer means and the movement of X and Y tables is controlled by servo motors. The operation of the servo motors, the microflash camera, and the aperture plate selector may be automatically controlled by computer program input means.

Master plates may be made on this machine.

10 Claims, 24 Drawing Figures

INVENTOR

ROLAND C. M. BEER

PATENTED DEC 5 1972 3,704,946
SHEET 02 OF 11
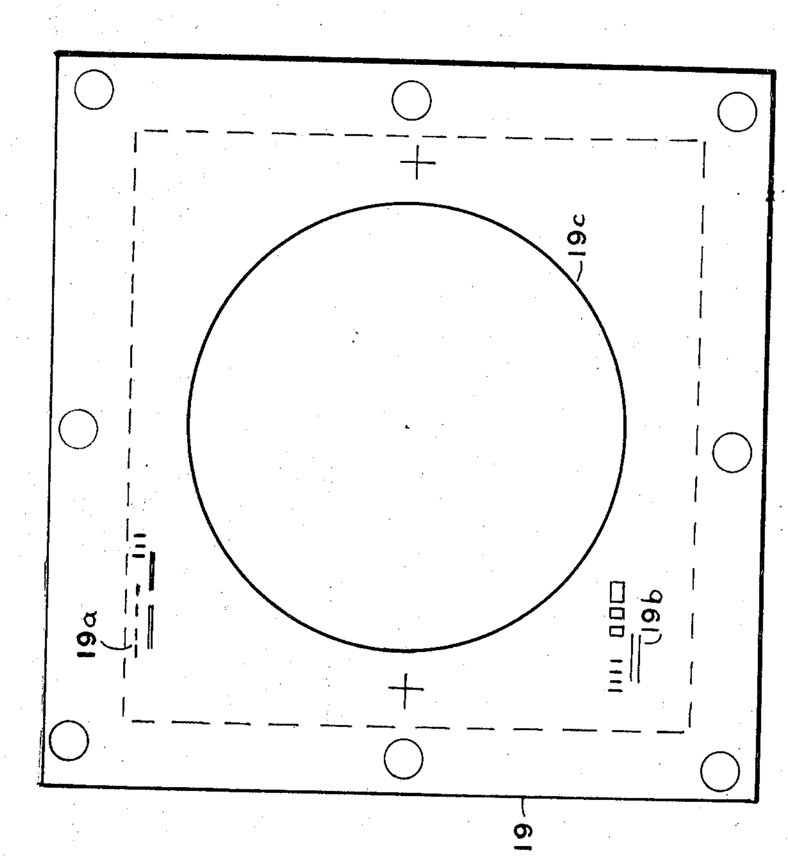
FIG 2A
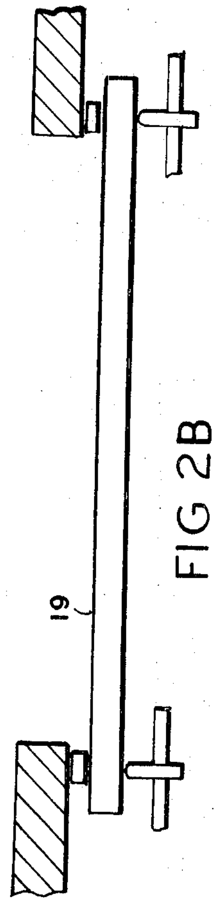
FIG 2B
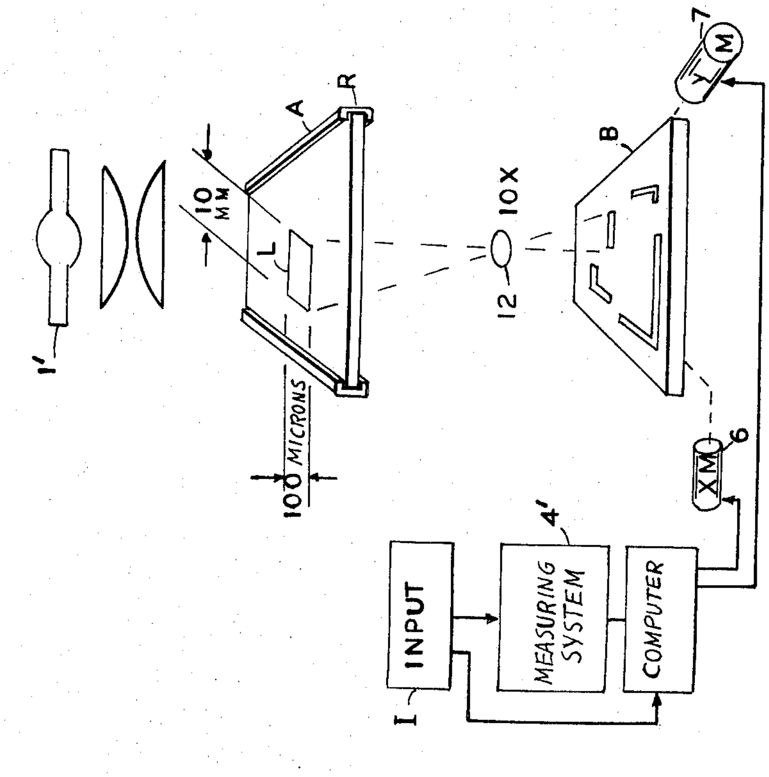
FIG IA
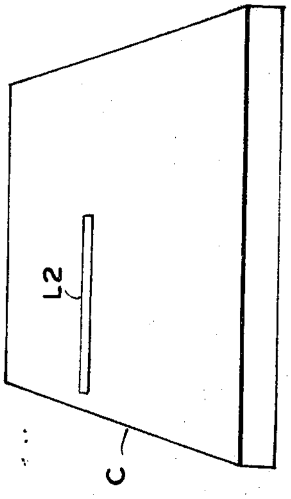
FIG IB
INVENTOR
ROLAND C. M. BEEH

INVENTOR

ROLAND C. M. BEEH

INVENTOR
ROLAND C. M. BEEH

INVENTOR
ROLAND C. M. BEEH

INVENTOR
BY
ROLAND C. M. BEEH

INVENTOR

ROLAND C. M. BEER

INVENTOR

ROLAND C. M. BEEH

INVENTOR

ROLAND C. M. BEEH

INVENTOR

ROLAND C. M. BEEH 3,704,946

INVENTOR

ROLAND C. M. BEER

MICROCIRCUIT ART GENERATING MEANS

This invention relates to means for generating microcircuits directly and automatically, for instance from a tape input.

Presently, the fabrication of Integrated Circuits requires the preparation of Artwork of large dimensions subsequently reduced and finally stepped on photographic plates to provide master photomasks.

The latest technological advances in the semiconductor field indicate an emphasis upon the fabrication of Large Scale Integration (LSI), in which a large number of active and passive elements are formed and interconnected together on a single wafer. LSI technology is aimed, in part, at substantially cutting down the cost per bit of electronic functional blocks belonging to systems of varying complexity in order to increase the overall system capability while the dimensions of the computing system itself are acceptable and its price accessible. This is possible since the basic material costs and the diffusion processes necessary to fabricate LSI's remain identical, except for some departures from the original Integrated Chip concept and fabrication now prevalent in the industry. However, the LSI concept demands a number of technical disciplines associated with fabrication. One area of re-evaluation is related to the fabrication of photomasks and their use for LSI.

There is a need for an Artwork Generator Camera that would offer operational ease, be compatible with input programs prepared by general purpose computers, and that would simplify and accelerate the production of photomasks from their inception to their use in the contact or projection printing on silicon wafers.

The present invention, which can also be used as a single barrel Microflash Camera, retains the same X—Y table construction, interferometric mensuration system, and general overall dimensions of the one-fourth Micron Automated Microflash Camera, disclosed in application Ser. No. 783,662, filed Mar. 14, 1968.

In manufacturing microcircuits it is necessary to prepare a master photomask of the circuit or of the components to be printed. The conventional manner of preparing the microcircuit masks, is to do the art work by manual drawing and then reduce the drawing photographically several hundred times. This is a very time consuming and tedious process since the art work and the circuit must be demagnified by factor of several hundred which requires a number of photo reductions. It is very difficult to align the photomasks for each step with micron accuracy so that each step is a source of error.

Presently, large scale drawings of photomasks are prepared before they are reproduced on rubylith or through other masking techniques. The original art work is then reduced to fabricate the reticle images that are utilized in the photostepping camera.

This method suffers from a basic limitation. It relies upon the quality of the objectives utilized in the reduction cameras, capable of 25 or 50X reductions. Difficulties are experienced here in flatness of field distortion and abberations visible at the edges of the circuits.

The present invention provides in a photostepping camera such as described in Ser. No. 738,662, filed Mar. 14, 1968. for Microflash Camera Means, an aperture plate and selector that is inserted in the optical head in place of the master reticle. This aperture plate allows for the selection of, for instance three holes 0.001, 0.010 and 0.100 inch square. These holes utilized with 10× objectives produce spots onto the photographic plates of either 0.0001, 0.001, or 0.010 inch square.

By operating the flasher at a high repetition rate and by moving the table in both the X and Y axes, line and image tracing can be performed onto the photographic plate located on the X—Y coordinate table. The format may be equal to the requirements of the reticle frame utilized as final reduction. For instance, a circuit 1.600 × 1.600 inches can be traced and then utilized as the master reticle for final reduction and step and repeat. The present invention preferably utilizes an automated version of the microflash camera in our above mentioned application. The tape program input is also provided with an additional command to select the three or more positions available on the aperture selector plate to allow for complete flexibility in designing integrated circuits. Design can be performed by moving in both axes, though it is recommended that a scanning be utilized. Flashing is performed on one axis in both directions, servo motors providing stepping one direction. Whereever, thick lines are required the program may be set up to index a large aperture plate to reduce circuit ray tracing time.

The present invention utilized in this manner, eliminates the use of reduction cameras. Between the original design of a mask and the final step reduction there are only two photographic plates required. Considerable time and savings are realized by fully utilizing the capabilities of the machine implemented with computers.

More specifically, the present invention provides means to generate and print a microcircuit directly from a tape input. The microflash camera has a master aperture plate which has apertures of different sizes and shapes. The photoplate which is to receive the printed circuit is mounted on a precision X and Y coordinate table underneath the microflash camera. The X and Y table is driven by X and Y servo motors and the microflash camera is flashed through the selected aperture to trace a line or other configurations, in predetermined patterns. In one embodiment of the invention a magazine of master aperture plates is provided. These plates have, for instance, sub-assembly apertures and means are provided for selecting the desired plate and the desired aperture.

Accordingly, a principal object of the invention is to provide new and improved precision microcircuit generating means.

Another object of the invention is to provide new and improved microcircuit are work generating means.

Another object of the invention is to provide new and improved automatic means for photographically tracing micro circuits on a plate.

Another object of the invention is to provide new and improved microcircuit art generating means which is adapted to be controlled from a tape or an equivalent input.

Another object of the invention is to provide new and improved microcircuit art generating means comprising, a stable base, a precision X and Y coordinate table movably mounted on said base, means connected to drive said table, X and Y interferometer means mounted on said base and adapted to measure the X and Y coordinate positions of said table and table mounting, means to mount a photographic plate on said table, and a microflasher mounted on said base over said table, and master aperture reticle means mounted in said camera.

These and other objects of the invention will be apparent from the following specification and drawings of which:

FIGS. 1A and 1B are schematic diagrams illustrating the basic principle of the artwork generator.

FIG. 2A is a plan view illustrating a typical photomask plate.

FIG. 2B is an elevation view of FIG. 2 partly in section.

Figure 1:
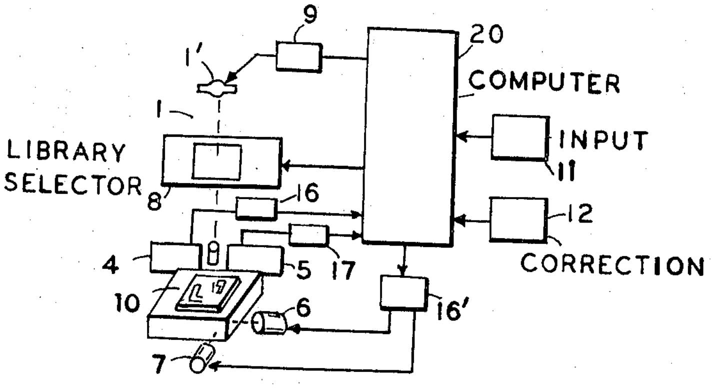
FIG. 1 is a schematic block diagram.
Figure 2:
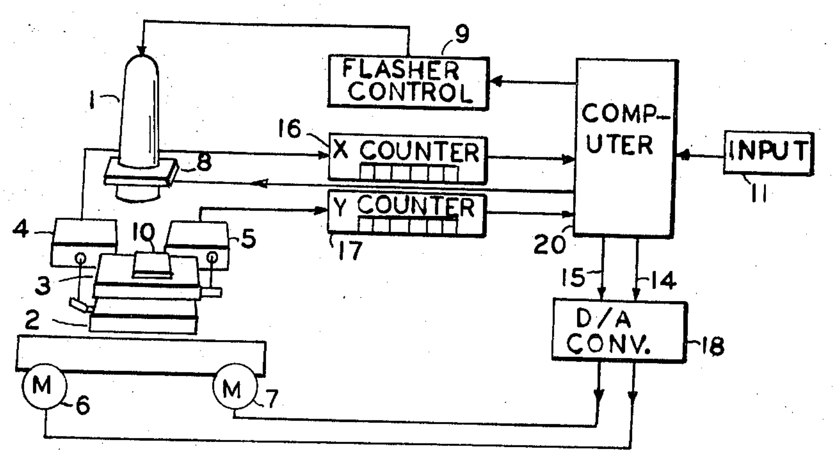
FIG. 2 is a schematic block diagram.

FIGS. 1 and 2 show schematic diagrams of the embodiment of the invention. The microflash camera 1 comprises a flash lamp 1' and associated optics such as illustrated in copending application, Ser. No. 768,662 for Microflash Camera Means. The microflash camera is modified by removing the reticle plate and inserting a master library reticle aperture holder and selector 8.

The receiver photogrphic plate 10 is mounted on precision X and Y coordinate tables 2 and 3, the positions of which are read b the interferometers 4 and 5 as described in the above mentioned application, as disclosed in our above mentioned application. The X table is adapted to be driven by X motor 6 and the Y table is driven by the Y motor 7. The outputs from the interferometers are connected to the X and Y counters 16 and 17 which are connected to the computer 20. The computer is adapted to receive an input program, for instance, a tape input from tape or other input means 11. If desired, environmental input means 12 may be provided to adjust the interferometer measurements, of the type shown in copending application, Ser. Number 594,213, filed Nov. 14, 1966 for CORRECTION COMPUTER.

The outputs of the computer 20 are to the flasher control 9, aperture selector 8, and the X and Y coordinate outputs 14 and 15. These outputs are converted from digital to analog information in the converter 18, the outputs of which are connected to drive the X and Y servo motors 6 and 7.

Figure 7:
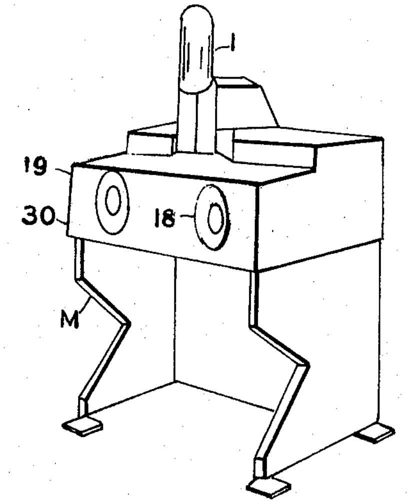
FIG. 7 is a perspective view of the camera console.

FIG. 7 shows a view of the console comprising mount M, flash camera 1 and X and Y handwheels 30 and 18 for the X and Y table. All moving parts are enclosed in dustproof enclosure 19.

Referring to FIG. 1A, and assuming a circuit is to be fabricated with a series of one micron lines, and for ease of explanation, the circuit is only made of orthoganal lines butted end to end. A master photoplate A is inserted into the reticle holder R of the camera which plate incorporates a line L 100 microns wide, and 10 millimeters long. One end of the line L is located on the optical axis. This line is minified by 10X lens 12 on to a photographic plate B. Utilizing the interferometers 4 and 5 as mensuration system 4', the table and plate B is positioned in the X and Y axes by means of two servo motors 6 and 7, receiving commands from an input means I program prepared on paper tape. When projected on this plate B, the lines become 10 microns wide and 1 millimeter long.

The circuit is traced on the plate by flashing the line segments at the desired positions. This plate B is then mounted in the reticle holder R and utilized in the conventional mode in a step and repeat system. The final lines on the final plate C (FIG. 1B) are 1 micron wide and 0.1 millimeter long, and produce long lines L2.

As shown in FIG. 1A, three photographic plates are required to provide a final step and repeat mask of limited geometry. Plate "A" which incorporates the simple line pattern, plate "B" which is inserted in the second operation for step and repeat at the same location as "A", and the final photomask plate "C" (FIG. 1B).

The present machine can accommodate one-fourth inch thick, four-fifths inch photographic plates which are becoming increasingly popular in the industry. The machine preferably allows for travel of 4×4 inches of total imaging area. This provides a ½ inch border for supporting the plate and also allows for printing information to be utilized in automatic selector type of projection or contact printers that may be utilized directly onto the wafer. A typical plate is shown in FIGS. 2A, 2B. Coding data **19*a*, 19*b* is preferably incorporated on the plate, separated from the image area 19*c***.

The Step and Repeat Camera provides ± one-quarter micron final repeatability and accuracy. Consequently, the registration accuracy of the artwork from the first projected image to the intermediate artwork generated pattern on the photomaster and to the final step and repeat process, should be within the final accuracy and repeatability of the machine itself.

The artwork generated should be formed within an accuracy that can be 10 times the final accuracy since a 10X minification objective is utilized; consequently, the artwork generated could be located within ± 2.5 microns. Similarly, the primary image that is used in the artwork generator (in the example the 100 microns wide and 10 millimeters long line), could be located with ± 25 microns, or ± 0.004 inch.

The artwork generator has been designed to align the original 100 microns line within ± 0.0005 inch, a tolerance exceeding by far the overall requirement of ± 0.004 inch.

Figure 3:
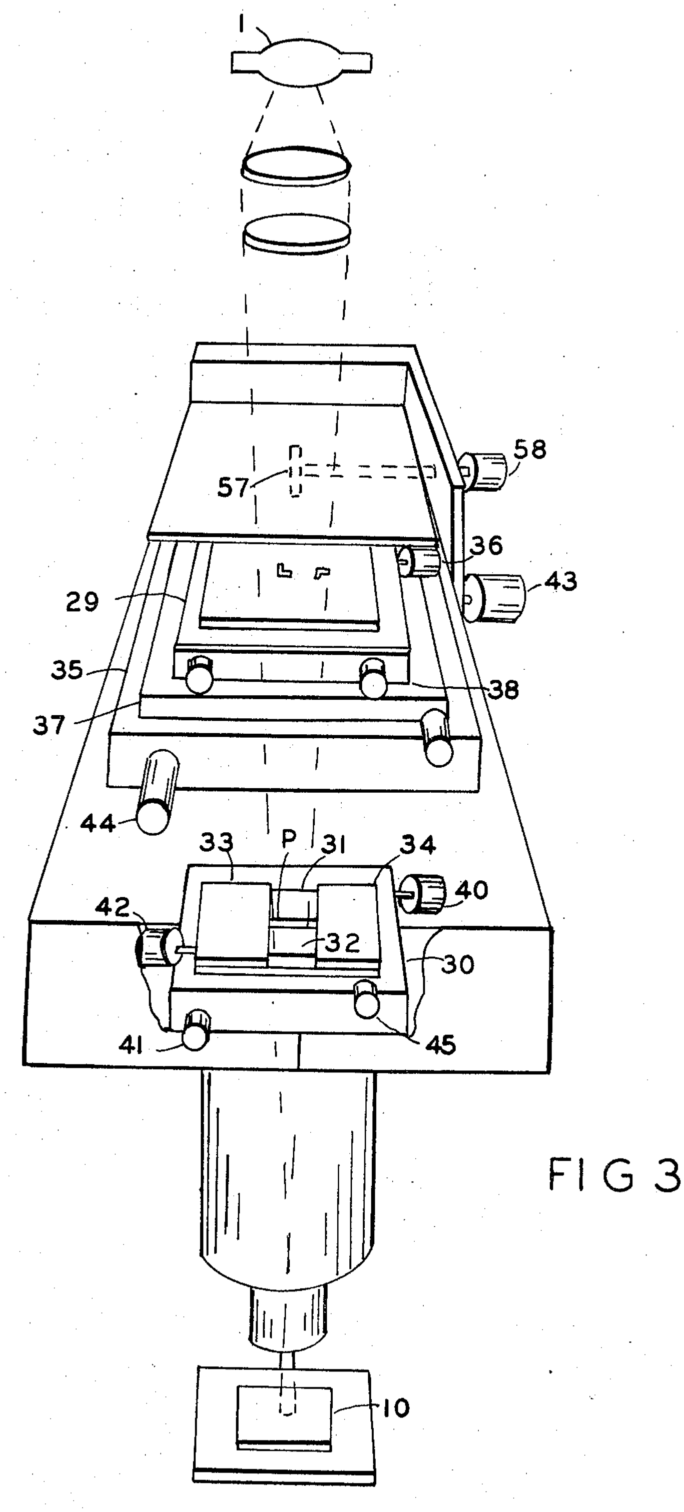
FIG. 3 is a schematic perspective view of an artwork generator.

Referring to FIG. 3, the Microflash Camera-LSI Artwork Generator comprises two basic units:

1. The 49 point circuit library plate 29.
2. The LSI variable aperture generator 30.

The 49 point circuit library comprises a photoplate 29 4 × 5 inches provided with, for instance, 49 photographic images of basic semiconductor device geometries belonging to a species of circuits. Each one of these 49 images may be flashed on a photographic plate through the means of a computer controlled X and Y mechanism located at the projection plane.

Photoplate 29 may be removed and there may be substituted master reticle photoplates that are utilized in step and repeat processes as they are performed with the Microflash Camera, disclosed in the above mentioned application. The change from Library photoplate mode of operation to a Step and Repeat Camera can be made rapidly.

Figures 9, 9A:
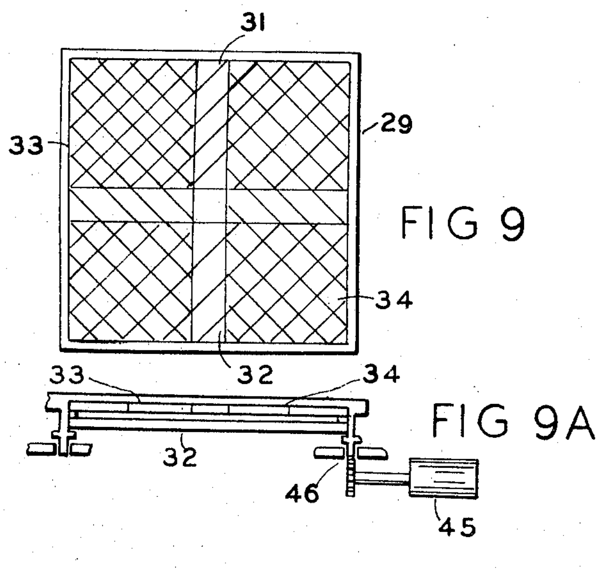
FIG. 9 is a plan view illustrating the variable aperture plate.
FIG. 9A is a side view illustrating the variable aperture plate.

The LSI Variable Aperture Generator 30 FIG. 9 is a device built as an integral accessory for the circuit library 29. It allows for the generation of square or rectangular lines or dots through the means of external computer commands.

The aperture P is made of expanding blades 31, 32, 33, 34 that not only allows fabrication of orthogonal patterns but can also be rotated through by means of the computer commands to produce oblique patterns.

The library plate 29 is mounted on a mounting 35 which is movable in X and Y directions manually or by means of X and Y servo step motors 36 and 37. This arrangement may be an X and Y table arrangement as previously discussed. The entire library mounting means is preferably rotatably adjustable by means of adjustment 38. Optional light speed X and Y servo motors 43 and 44 may be connected to drive a separate sub stage 35'.

The variable aperture generator 30 is also adjustable in the X and Y directions either manually or motor driven by means of X and Y controls 40 and 41, and rotation control 45. The shutter plates of generator 30 may be adjusted manually or by motor 42.

Either the 49 Point Circuit Library or the LSI Variable Aperture Generator can be utilized. Each of these devices must be brought alternately to the focal plane of the 10× minification objective provided with the system. The applicants have designed a computer controlled system whereby either of the selected devices is brought automatically in position by a slight displacement of the vertical plane of the system, by means of an elevation cam means 57 driven manually or by servo motor 58.

The 49 Point Circuit Library 29 and the Variable Aperture Generator 30 are described in detail in a later part of this description.

This unique combination of a circuit library and variable aperture with the added provision for standard step and repeat operation must be optically aligned in order to insure perfect registration of photomasks as required in LSI applications. In order to simplify this operation and to allow for rapid alignment, we have designed the system in such a manner that both the Circuit Library and the Variable Aperture Generator rest on alignment platforms which are provided with three easy manual or motor controls X, Y and angular.

The optical projection capabilities of the Artwork Generator corresponds to a total imaging area of 1.600 × 1.600 inches. It can be indexed in both the X and Y axes to position any one of 49 different points on the optical axis of the camera.

Figure 4:
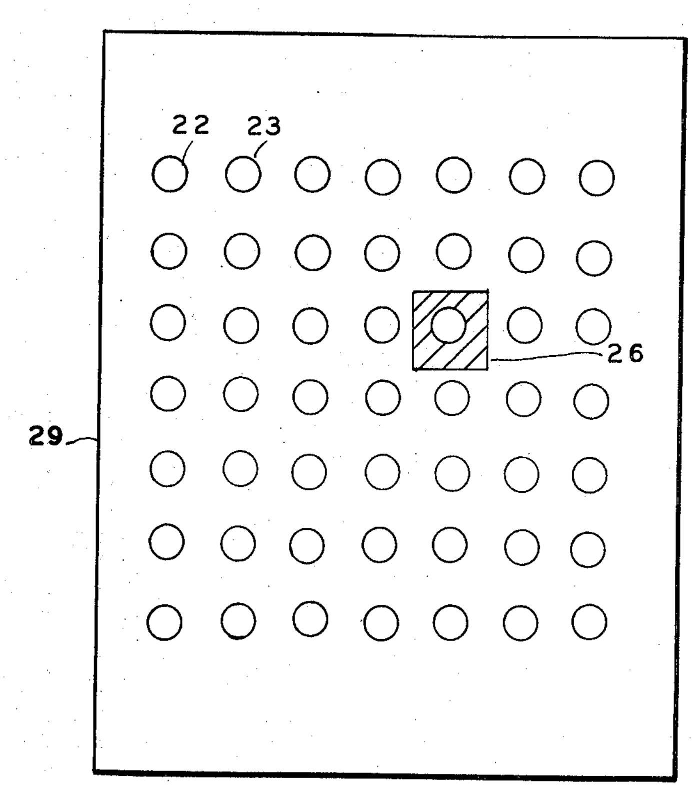
FIG. 4 is a plan view illustrating a circuit library photoplate.

Referring to FIG. 4, the 49 axial reference points 22, 23, etc. are located 0.500 inch apart from each other and correspond to the selection of flashing areas slightly smaller than 0.460 × 0.460 inch square. Each effective usable flashing area 26 is 0.450 inch square.

In accordance with the registration requirements, the 49 points are indexed with a repeatability of ± 0.0005 inch. These 49 photographic images are located on a 4 × 5 inches photographic plate, preferably one-fourth inch thick. The selection of points of the 7 × 7 index is made through the use of X and Y table mechanisms driven by electric step motors 36 and 37 to allow for the displacement of one point to the next. While X and Y translation is being performed, Z axis migration at the reticle plane is kept within ± 0.0005 inch to insure maximum focusing accuracy at the object plane.

The indexing of the 49 selected points may be manually or electrically controlled; for instance, from a binary code generated in the computing system, described in a later part of the text.

The maximum lapse of time required to move from one point to the next is approximately 1.5 second, while the maximum time to move from two farthest points is 21 seconds.

Figure 5:
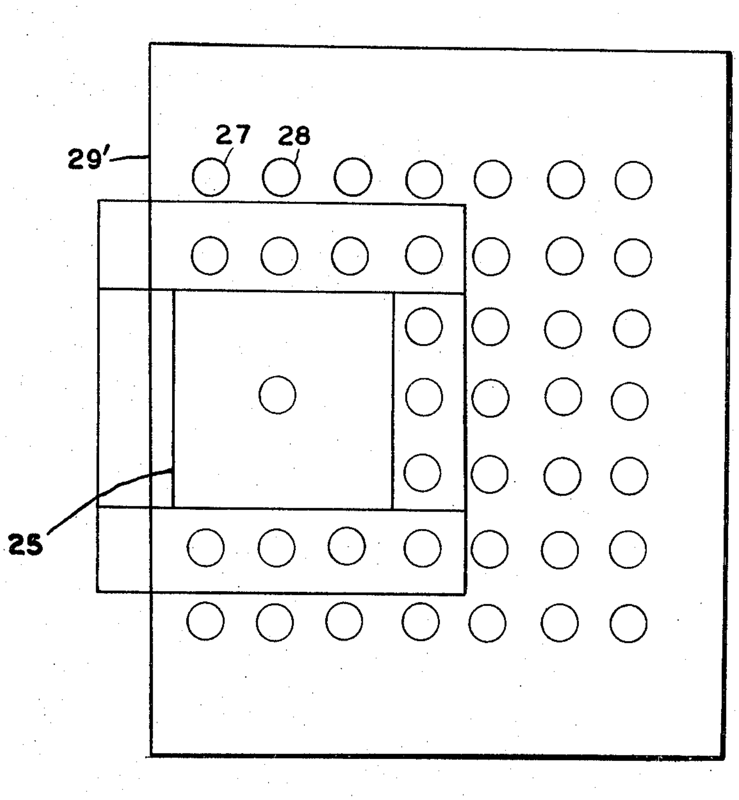
FIG. 5 is a plan view illustrating a maximum size of image incorporated in a circuit library photoplate.

FIG. 5 shows a Circuit Library plate 29' comprising 30 multi-patterns 27, 28, etc., each 0.450 inch square, and one 1.5 inches square image area, 25.

The large pattern is particularly useful when fabricating resistors or capacitors.

Figure 6:
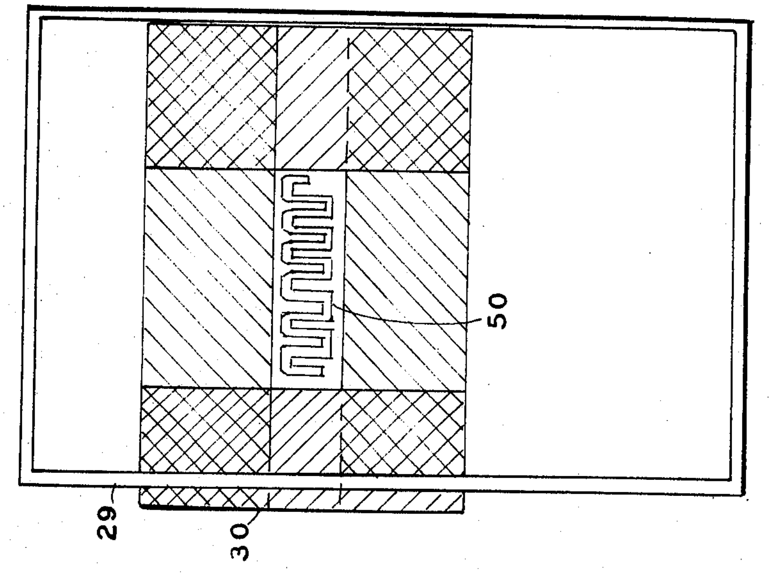
FIG. 6 is a plan view illustrating imaging of elongated semiconductor patterns.

Referring to FIG. 6, the variable aperture generator 30 mechanism provides a dual function. In the first mode, it can be used independently to generate patterns on the photoplate, in which case, either the 49 point circuit library photoplate is removed from its frame or may be located on a vacant image area by addressing the computer to such specific 7 × 7 blank selection point. Similarly, it can also be used with the master reticle holding frame located in the place of the 4 × 5 inch photographic plate since there is no projected image in this mode.

In the second mode, the variable aperture generator mechanism is utilized to blank out unwanted portions of the imagery stored on the circuit library plate. Reference is made to FIG. 5. FIG. 5 shows the utilization of the maximum size of the circuit library imagery. In this case, a square pattern of final projected size of 0.015 × 0.015 inch is available. It occupies nine of the 49 selective points. The center point is utilized as the main axis to adjust the opening of the variable aperture generator blades 31, 32, 33, 34 to this maximum size. In this case, the plane of the aperture generator blades does not need to coincide with the projection plane corresponding to the plane of imagery located on the 4 × 5 inch photoplate. It is located slightly below the focal plane. In this case, program commands may be generated from the computer to correspond to the overall size of the imagery being selected.

This unique design allows the projection of images that are rectangular as reactor image 50 shown on FIG. 6. Accordingly, the flexibility of the system is such that elongated patterns such as resistors may be stored in their entirety on the circuit library and flashed rapidly on selected portions of a photomask. This eliminates the need of an individual computer tracing scheme which for repetitive patterns requires extensive programming.

The circuit library saves considerable time in fabricating repetitive images. It takes 1.5 seconds to move from one point to the next while to index the table between extreme points takes 21 seconds. In order to reduce indexing time sequential programming is recommended.

Figure 8:
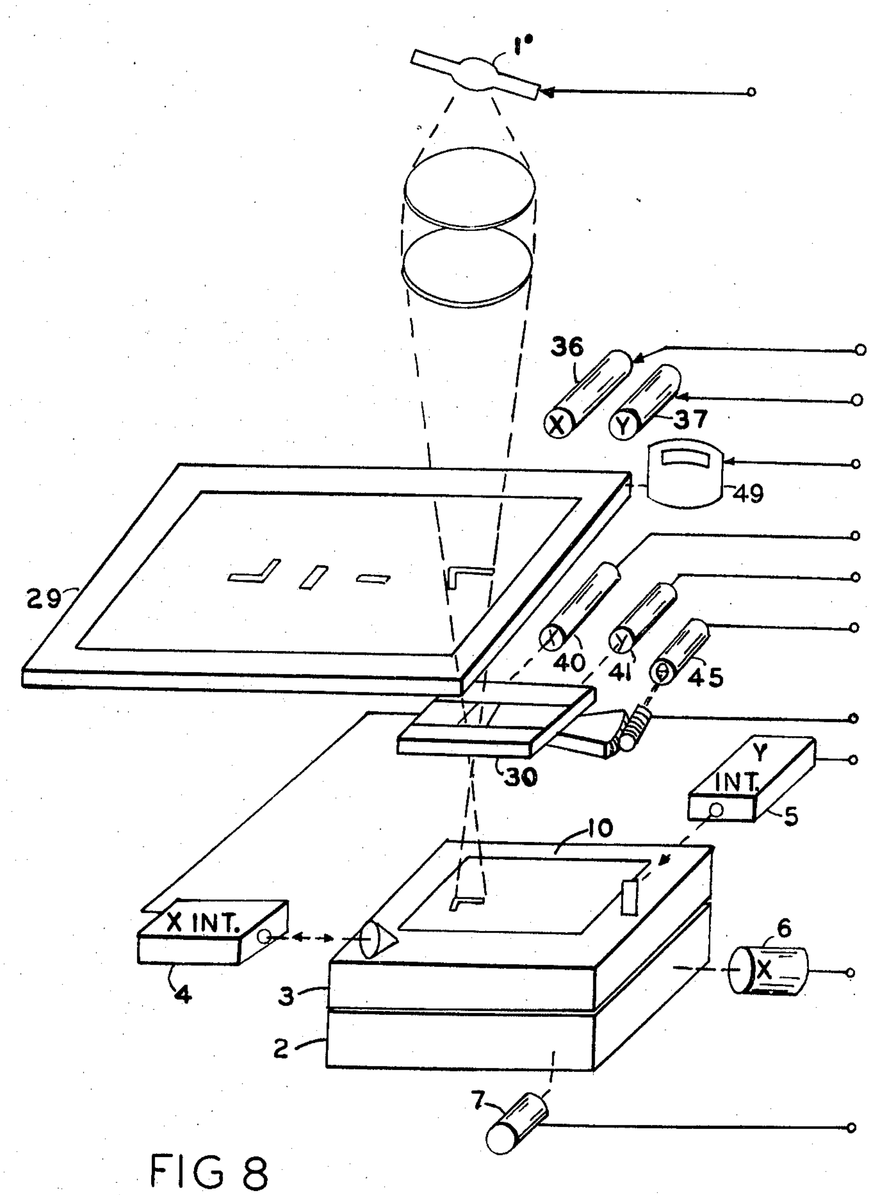
FIG. 8 is a schematic diagram illustrating the required controls to operate circuit library selection.

FIG. 8 illustrates the basic input requirements to operate the 49 Point Circuit Library 29.

In FIG. 8, the circuit library plate 29 is controlled by X and Y drive motors 36 and 37. The variable aperture generator 30 is controlled by X motor 40, Y motor 41, and rotation motor 45. The location of the receiving photoplate is measured by X interferometer 4 and Y interferometer 5 and the photoplate 10 is moved by means of the X servo motor 6 and the Y servo motor 7. The X and Y table structure is shown schematically in FIG. 8 and may be as disclosed in copending applications, Ser. No. 738,662, filed Mar. 14, 1968 for Microflash Camera and U.S. Pat. No. 3,377,111, granted Apr. 9, 1968 for Precision Coordinate Axes Table Means. A levelling and/or elevation sensor 49 is preferably connected to the plate 29. This connection need not be mechanical, but may be optical.

Photoflash camera means is shown in copending application, Ser. No. 660,862, filed July 26, 1967 for Photo Resist Projector Means.

Interferometer measuring means is shown in U.S. Pat. No. 3,271,676, granted Sept. 6, 1966 for Interferometer Means.

THE LSI VARIABLE APERTURE GENERATOR

Referring to FIG. 9, the Variable Aperture Generator 29 increases the flexibility of the basic system and opens new avenues in the fabrication of highly complex geometries as encountered in the production of photomasks for Large Scale Integration (LSI) applications. It has been designed to minimize human errors during the fabrication of photomasks.

This device, located below the circuit library plate, comprises two pairs of shutter blades that can move in and out symmetrically from the optical axis. The dual purpose of this device has been reviewed.

The two sets of aperture blades 31, 32, 33, 34, located at right angles, can make either square or rectangular apertures, and in addition to the X and Y opening of these blades, the image formed through the slit can be rotated by motor 45 geared to a circular ring gear 46 from 0° to 90° in order to generate inclined lines on patterns. The system results in lines variable in length from 0.002 to 1.500 inches, in width of 0.002 to 1.5 inches, and in rotation anywhere within 360° in 0.2° steps.

The Variable Aperture Generator 29 is operated from three step motors, the X, Y and O (rotation) motors. These step motors are commanded manually or from the computer.

Typical specifications of the separation plate 29 are:

| | |
|---|---|
| Minimum Size Aperture: | .002 in. (50 microns square) |
| Maximum Size Aperture: | 1½ inch square |
| Maximum Rectangle: | 50 micron wide by 1½ inch long |
| Steps Available: | 768 steps in each axis Accuracy ± ¼ step (each step is .002" ± .0005") |
| Operating Time: | One second required per axis to move from .002 inches wide to ½ inch. 3 seconds to move from smallest to largest slit opening. |
| Rotation: | 0 to 90 degrees (this rotation, combined with X and Y motions, allows orientation of a line anywhere within 360° in 0.2° steps. |
| Steps Available in Rotation: | 450 steps Accuracy ± ¼ step (± .05°) |
| Operating Time | 5 seconds required to rotate the aperture from 0 to 90 degrees. |

OPERATION

There is preferably simultaneouus X, Y and $\theta$ aperture motion. During aperture size selection, the main X—Y table supporting the photocassette located below the minification objective remains stationary.

Figure 10:
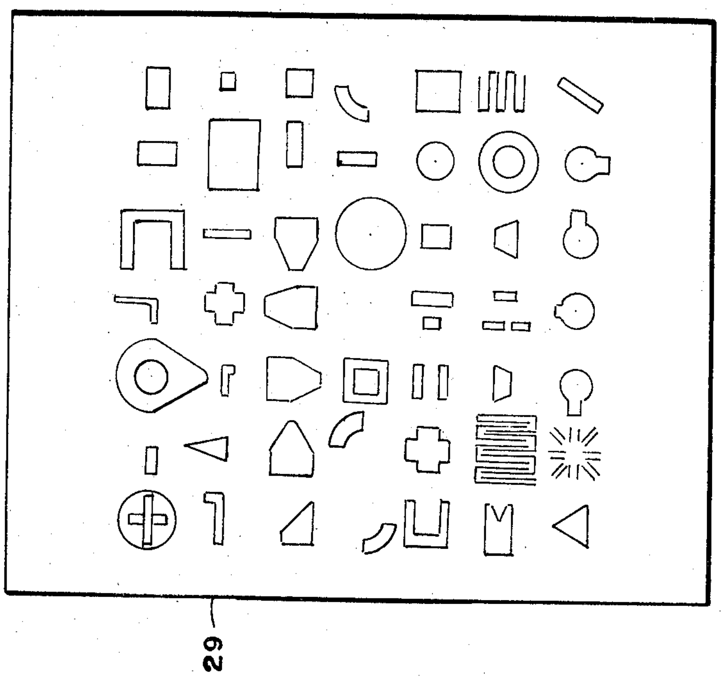
FIG. 10 is a plan view illustrating a typical circuit library photoplate.

FIG. 10 shows a typical library plate 29 showing typical elements. The photographic plate utilized as the circuit library master can be prepared in different ways. It can be fabricated entirely on the present Artwork Generator-Microflash Camera, or in steps.

Library Master Self-Preparation

Figure 11:
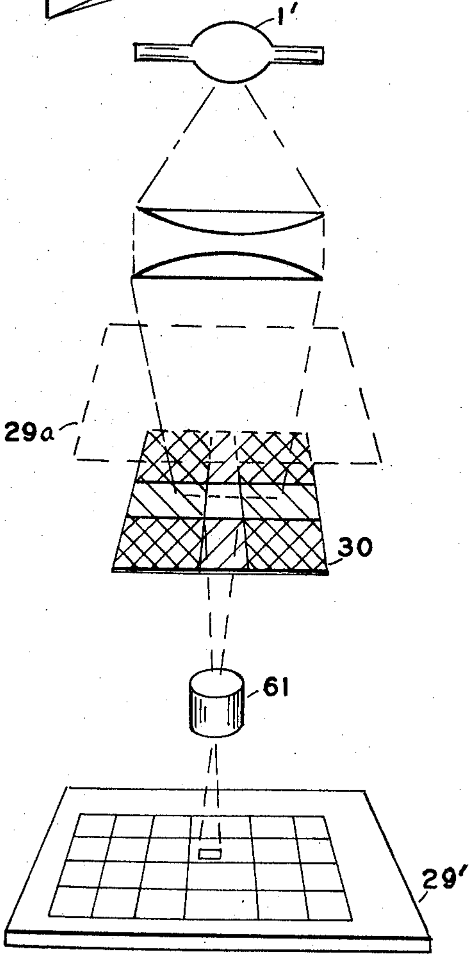
FIG. 11 is a schematic diagram illustrating the fabrication of circuit library photoplate.

Referring to FIG. 11, a 4 × 5 inch unexposed photographic plate 29' is inserted in a suitable mounting on the machine. In this mode of operation, the circuit library 29 holder mechanism **29*a* is held inoperative. The variable aperture generator 30 is utilized. The elevation mechanism (FIG. 3) is adjusted to bring the expanding and contracting blades of the variable aperture generator within the imaging plane. Utilizing the 10× objective 61, images are formed by means of the variable aperture generator manually or through the computer input programs and are flashed at the 49 chosen locations in plate 60** determined by the 7 × 7 coordinates.

Conventional Method to Prepare Circuit Library

Figure 12:
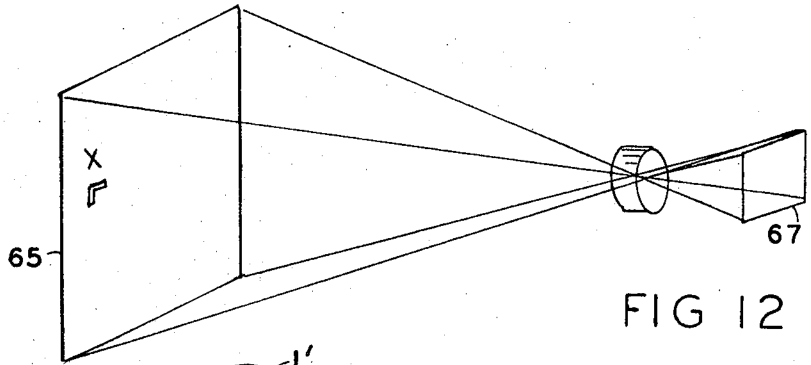
FIGS. 12 and 12A are schematic diagrams illustrating the preparation of circuit library photoplate from artwork reduced in the two step process.
Figure 12A:
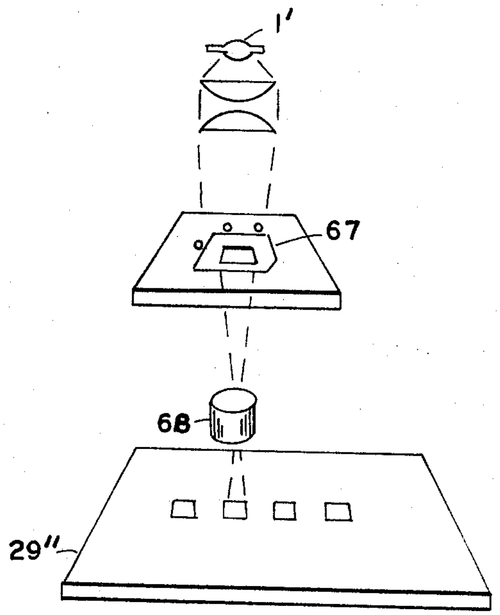

Referring to FIGS. 12 and 12A, this method utilizes individual patterns prepared on rubylith 65 and reduced by 25 times by lens 66 through conventional methods on to a 2½ × 2½ inch plate 67. Plates 67 are then used with the Artwork Generator-Microflash Camera with a 4× objective 68 to flash the desired patterns on a 4 × 5 inch plate 29'' which becomes a circuit library, as is shown in FIG. 12.

THE CIRCUIT LIBRARY CONCEPT AND THE LSI APPLICATIONS

Conventional Artwork Generators of the scriber type or of the light beam type are usually large drafting machines.

The present Artwork Generator traces circuits directly on the master reticle. There is no intermediate step reduction required. The storage space requirements are consequently reduced. The overall stability of glass is a function of the surface of the glass. Scratching of emulsion is reduced, handling is easier, and dust contamination minimized since smaller areas are exposed to the air.

The present approach, through the utilization of a circuit library available on easily stored high resolution and stable 4 × 5 inch master photoplates reduces considerably the computer time required to trace identical patterns belonging to a single circuit. In an integrated circuit numerous pads of similar geometries are utilized in large scale integrated circuits. Identical diodes, transistors, resistors or capacitors of same geometries are incorporated on the same circuit, and the capability of presenting as a whole such repetitive geometries increases the effective production capabilities of the machine.

An analysis, based upon a survey of the field, indicates that several essential patterns could be stored on the circuit library master photoplates. Even though manufacturers utilize special design and geometries corresponding to their own patterns and circuits, the patterns can be generally classified into the following categories:

PADS

Usually, 4 × 4 mils (they could belong to the 49 aperture selector system since the maximum area covered is 4.6 × 4.6 mils).

DIODES

Diodes have several geometries ranging from 1 × 1 mil down to 0.3 × 0.3 mils. These geometries can be stored on a single 49 aperture selector plate.

TRANSISTORS

Small transistors can be incorporated within 0.2 × 0.4 mils geometries while large ones are 0.2 × 0.6 mils. The first category can be incorporated in a standard 49 aperture selector plate while the second category may be stored in a different selector plate as shown in FIG. V.

RESISTORS

Resistors vary widely in overall sizes. Several models could be stored on the plates. Standard sizes range from 0.2 × 0.4 mils up to 0.2 × 0.6 mils.

Similar to the transistor geometries, two aperture plates may be utilized to store the resistor patterns.

CAPACITORS

These also vary widely in dimensions according to the active components utilized on a silicon wafer. Some typical capacitors are 0.2 × 0.4 mils while larger ones are 0.4 × 0.4 mils. Most of them can be stored on plates provided with 49 apertures.

TYPICAL PHOTOMASK FABRICATION

This section describes the fabrication of photomasks utilizing the present Artwork Generator by switching from the line generation mode to circuit pattern flashing depending upon the geometry required by the circuits.

Figure 13:
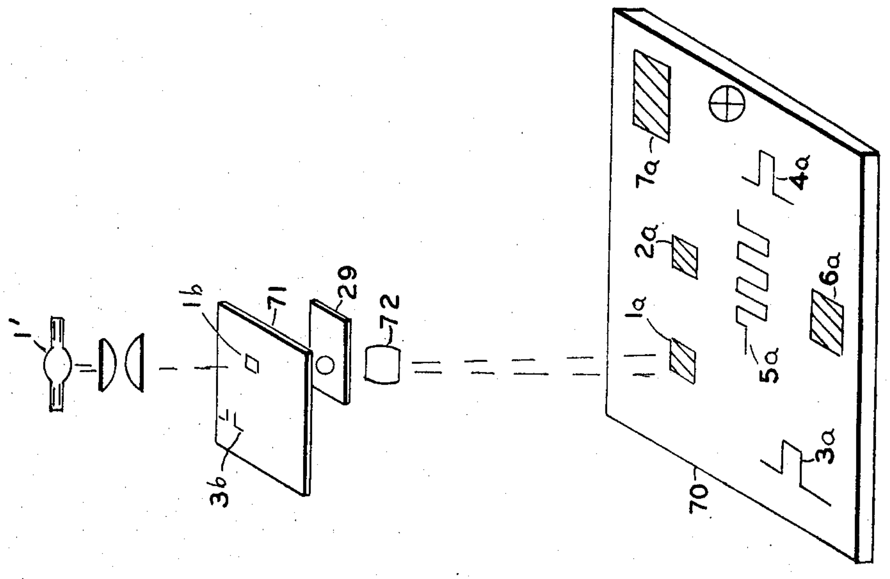
FIG. 13 is a schematic diagram illustrating the first mask fabrication.

Components such as capacitors and transistors require several masks to be used in sequence. Refer to FIG. 13 showing the fabrication of a first mask. The mask in this example contains parts of two diodes *1a* and *2a*, one transistor *6a*, one large capacitor *7a*, small resistors *3a* and *4a*, and a larger resistor *5a*.

The diode *1b* and the small resistor, since they belong to small geometries, are incorporated in a 49 aperture plate 71. These images are minified by lens 72 on the first master mask plate 70 and are flashed on it in the positions preselected during design that have been entered into the computer in X—Y coordinates.

Once *1a*, *2a* and *3a* have been flashed, the photoplate 71 is moved to the next positions to bring in the projection plane two large geometries, a resistor, and a transistor. These are flashed sequentially on the plate 70 to provide the respective imagery locations *5a* and *6a* similarly entered from the computer program. Finally, the plate 71 is moved into location to flash a larger capacitor *7a*.

The illustration (FIG. 13) shows the projected images on plate 70 to be larger than the original images. This is done only for visual representation since in reality the images are minified by 10× on to the photographic master plate 70.

Figure 14:
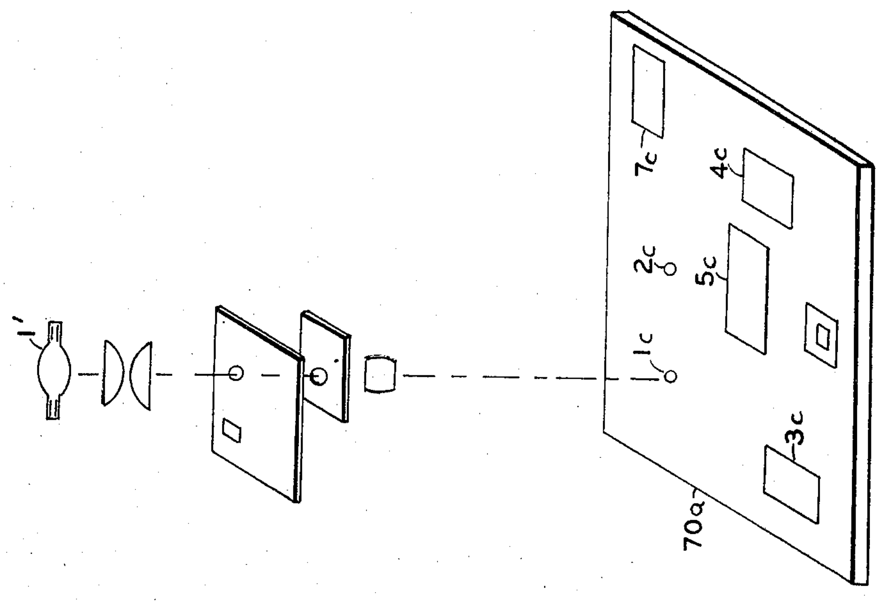
FIG. 14 is a schematic diagram illustrating the isolation pattern.

FIG. 14 illustrates the fabrication of the second layer mask *70a*. A program similar to the program originated during the fabrication of the first set of masks is generated. However, the selection of imagery from the circuit library is different since each component flashed on the photomask must be fabricated according to the next layer or stage required in the device function. For instance, during this operation emitters *1c*, *2c* are imaged for the transistors and diodes, while isolation patterns *3c*, *4c*, *5c* are provided for the resistors, and the dielectric pad *7c* for the capacitor.

Figure 15:
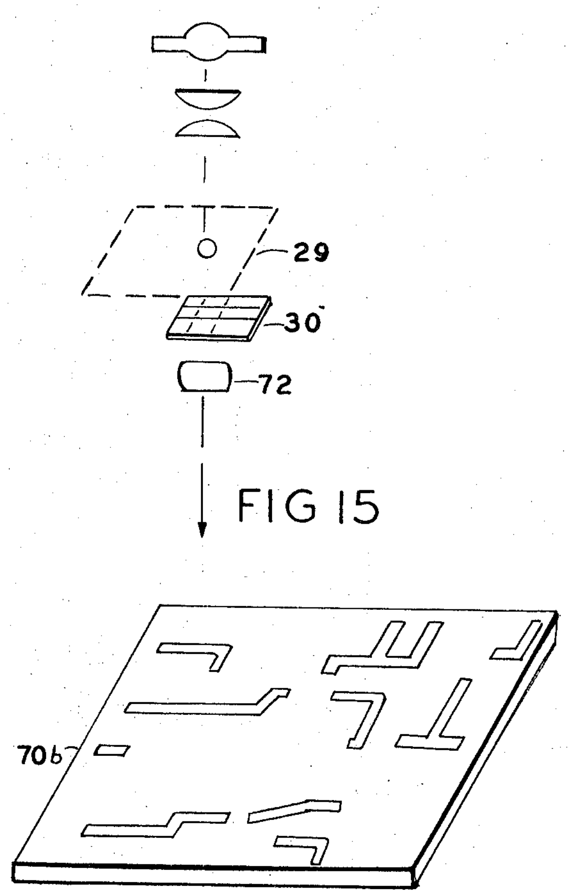
FIG. 15 is schematic diagram illustrating the interconnection pattern.

FIG. 15 illustrates the fabrication of the interconnection mask *70b* by using the variable aperture generator 30. During this operation, the circuit library 29 is positioned on a vacant image point of one of the 49 selection points.

Figure 16:
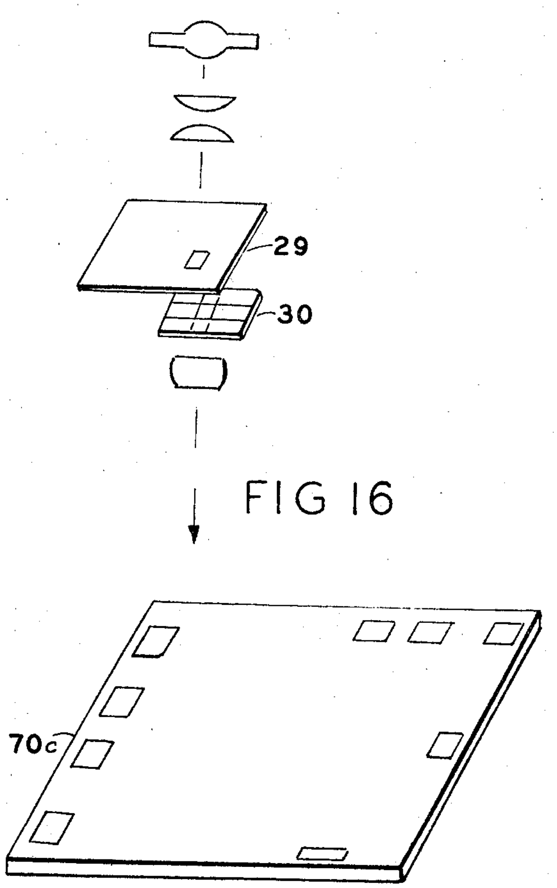
FIG. 16 is a schematic diagram illustrating the metallization mask.

FIG. 16 shows the final fabrication, or metallization mask *70c*. It is generated by flashing standard pad geometries at the locations commanded by the computer.

There are multiple variations and approaches to the above description which are beyond the scope of this description, and depend upon the complexity and extent of the circuits.

The present Artwork Generator-Microflash Camera allows for infinite selectivity due to the random access capability of the circuit library.

ALIGNMENT CAPABILITIES OF THE MACHINE

Figure 17:
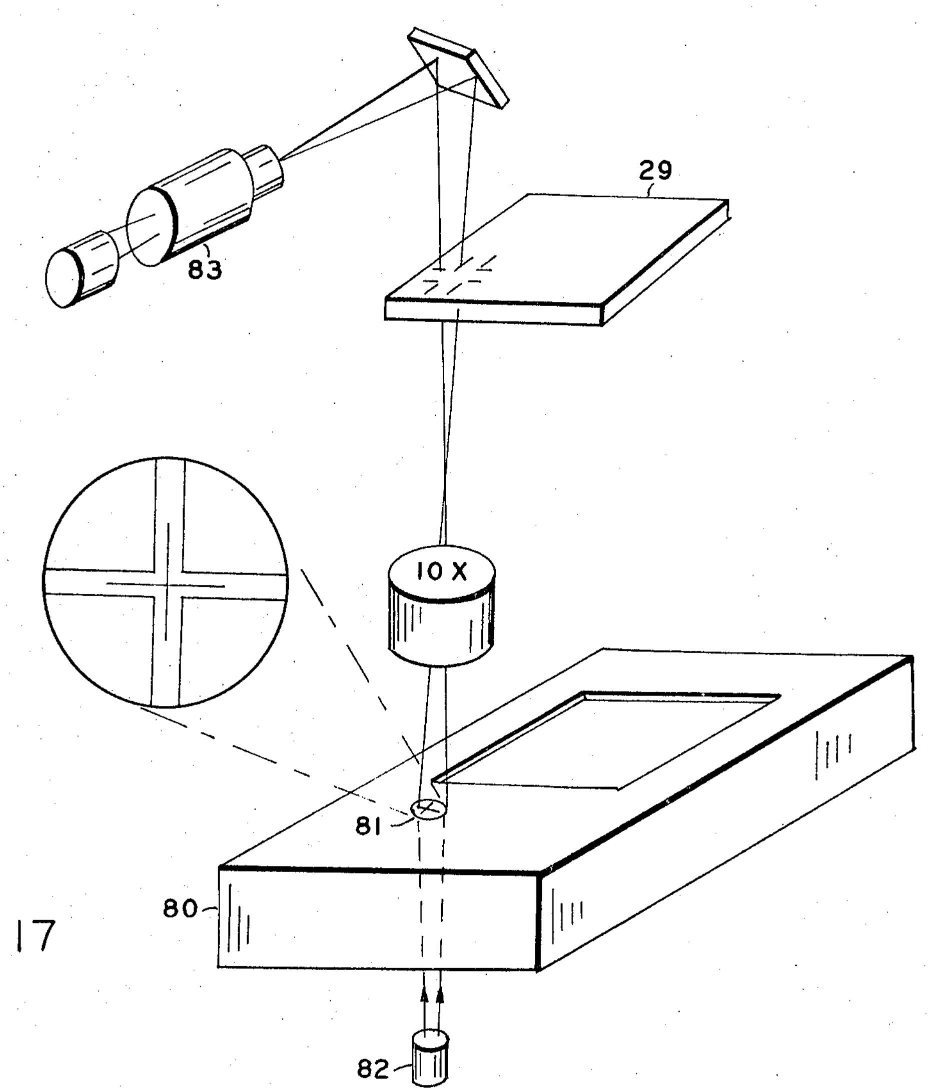
FIG. 17 is a schematic diagram illustrating the alignment and zero reference features.

Reference is made to FIG. 17. A unique alignment and focusing mechanism is incorporated in the Artwork Generator-Microflash Camera. It provides the multiple functions of focusing both the 4× and 10× objectives, and the precise alignment of either the circuit library photoplate 29 or of individual master reticles used in the step and repeat process. The alignment device is also used to initially align the Variable Aperture Generator. Alignment means are also shown in copending application Ser. No. 626,532, filed Mar. 24, 1967.

OPTICAL FOCUS FEATURE

For precise focusing, an image of the cassette 80 stadia hairs 81 is projected upwards by light source 82 from the cassette to the reticle plane for observation by a demountable microscope 83. The illuminated stadia hairs 81 are on the cassette 80 located outside the plate area. For focus, the stadia hairs are moved over the projection lens. The image is then projected upwards coplanar to the glass reticle for observation with a 25× microscope 83.

The stadia hairs are also useful for single point reference of the cassette to any additional reticle which may be inserted, and may be used to verify the accuracy and repeatability of the mensuration and mechanical features of the table.

This provides accurate positioning of the glass reticle plate 29 in X—Y—O and eliminates the use of auxiliary alignment fixtures. It provides complete interchangeability of reticles for superimposing different reticles on the same plate, and also serves to precisely focus the machine.

Alignment is accomplished by superimposing the projected image of the stadia hairs alternately on the reference marks of the master plate and observing through the microscope. At this time, rotation correction and axial alignment in X and Y are made. This assures that the master reference marks are parallel to the direction of table motion. This procedure will produce reticle alignment within the specified ± one-fourth micron accuracy on the photoplate.

ELECTRONIC CONTROL SYSTEM

Control

Figure 18:
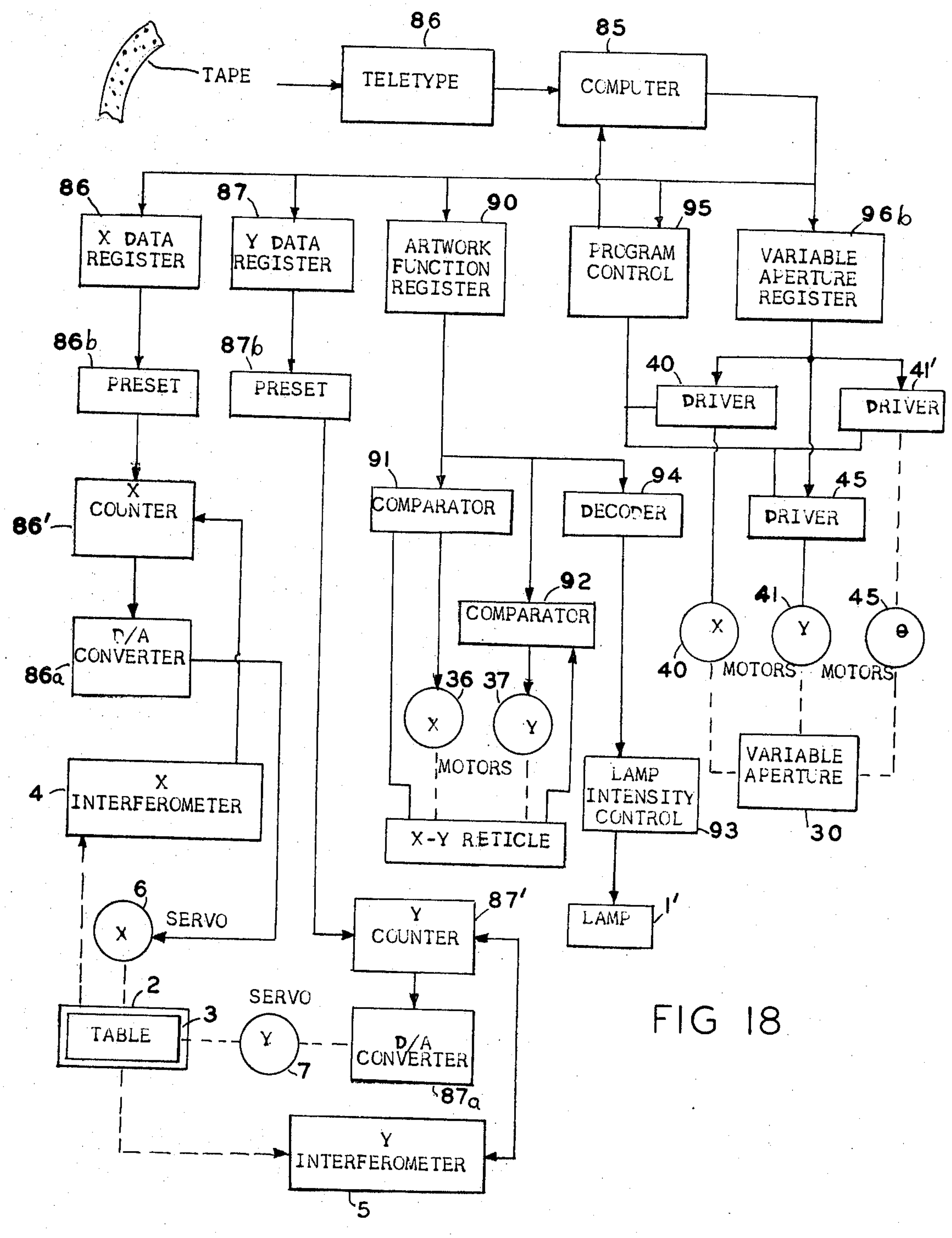
FIG. 18 is a schematic diagram illustrating the functional block diagram of the art generator.

The control system uses conventional techniques and components and preferably utilizes, for instance, a conventional computer to program and control the functions of the Art Generator. This computer provides simple means of preparation of programs, and fully automatic operation throughout one full plate. The Functional Block Diagram is shown in FIG. 18.

Computer

The computer 85 performs two general functions. One of these consists of the preliminary "bookkeeping" operations which include conversion of inch or metric dimensional inputs to interferometer counts, calculation of the barometric pressure correction, and applying this correction to the interferometer counts. The second basic function of the computer is supplying control information to the control system by loading the proper storage registers upon program command.

Input to the computer may be from a conventional teletype 86 which may include a tape reader for program read-in, and a punch for program preparation. The keyboard is used for program preparation and barometric pressure input.

Operating Modes

The program and machine design are such that the 7 × 7 reticle selection is simultaneous in both axes, and simultaneous with the lamp intensity selection and table motion. However, stepping of the Variable Aperture 30 cannot take place while the table is in motion. It will, therefore, be necessary to program for this condition. It is possible, however, to position both the 7 × 7 reticle and the variable Aperture simultaneously when the table is not in motion.

Interferometer Counter/Registers

The data registers 86, 87 are loaded by the computer, and on command, the data is transferred into the Interferometer Counters 86', 87'. The numbers preset be preset means **86*b*, 87*b* into the counters become error signals which are connected to Digital to Analog convertors 86*a*, 87*a* and to the servo motors 6 and 7 to drive the table. As the table 2, 3** moves, each interferometer generates counts which subtract from the total in the counter. When the counter reaches zero, the servo may stop the table, if required, or if a slow command has been given, the counter will be reloaded and the motor continues to drive in the same fashion until a servo-stop command is issued.

Artwork Function Register 90

The register 90 stores a 12 bit binary word from the computer. This composite word consists of three individual words representing X and Y position of the 7 × 7 artwork reticle, and lamp intensity. These are fed to the appropriate comparators 91, 92 and motors 36, 37, which drive the given axis the shortest distance to the next required position. Each reticle axis has a digital readout associated with it so that when the readout is in coincidence with the required position, a conforming signal is returned to the computer. The optional lamp intensity control 93 is selected by decoder 94 relays which decode the command. These relays select one of four Variacs on the flash power supply giving four independently adjustable flash intensity levels.

Variable Aperture Control

The computer 85 is used to count the actual number of step pluses to the stepping motors 40, 41, 45 in each of three axes. When the program control register 95 calls for a change in any axis or of the aperture, the computer compares the existing position with the new required position and drives the proper number of steps in the shortest direction. The computer feeds variable aperture register 96 which operates drives 40', 41' and 45'.

Programming for Motors 40, 41 and 45

The program tape preferably allows for the insertion of offsets between runs, and skip flash commands. The program tape also includes conversion from inches to interferometer counts, and the barometric correction computation. For each unique plate to be prepared by the Generator, a specific data tape is fed into the computer. This tape contains the following information: flash spacing, flashes per row, (if applicable), line spacing, number of lines, offset distances, and skip flash commands. Most of this is the dimensional information associated with a specific plate. The length of the tape is primarily a function of the number of offsets of the basic pattern and the number of flashes to be skipped. The basic dimensional information can be contained in a length of a few inches of tape.

USE OF THE ARTWORK GENERATOR FOR THE FABRICATION OF LSI'S

The Artwork Generator is most suited for the fabrication of LSI circuits; this is due to the incorporation in the machines of a number of significant features whose merits are reviewed here.

1. ACCURACY AND REPEATABILITY CHARACTERISTICS

The machine exhibits ± one-quarter micron accuracy in both axes over a 4 inch area. Accuracy and repeatability are independent of flashing direction. Images and points can be located or flashed anywhere onto the photographic plate, unlike other machines that are restricted to unidirectional flashing modes; for instance, some machines equipped with lead screws and correcting cams have preferred operational directions.

2. MENSURATION

The interferometers provide information related to the position of the table in digital form that can be processed directly by digital computers. The digital data available from the interferometers can be decoded into its equivalent and be compared with binary data stored into computer memories for in line computers, or from tape programs prepared in advance by general purpose computers.

3. MENSURATION SENSITIVITY

Unlike other mensuration systems utilized with X—Y tables, the interferometer sensors provide three different mensuration ranges. When set at maximum sensitivity where plus or minus one fringe-count equals 0.068 micron, the sensitivity is 3.6 better than the overall accuracy of the system. This unique feature in sensitivity over the 4 inch format contributes to the overall justaposition requirements of widely separated points belonging to the LSI geometries.

4. DUST PARTICLES, PIN-HOLES IN PHOTOMASKS

One of the most severe problems associated with the fabrication of photomasks, and applicable in particular to LSI since widely separated geometries must show continuity and interconnections, is related to the inclusion of dust particles during photography. These inclusions may cause breaks in lines, pin-holes, and random imperfections resulting in non-operative elements or malfunctions of the final circuits reproduced on the wafer.

The problem prevails with conventional systems utilizing multi-step reductions of large images down to final microgeometries since large glass surfaces are more apt to collect dust particles than small ones. Handling of the plates, as well as inadvertent fingerprint marks and scratches due to contact with metal or glass plates, are additional factors contributing to the overall imperfections of conventional photomasks. Filtering and controlled particle sizes of solutions used to process the emulsions are mandatory to achieve submicron imageries.

In regard to contamination of the photographic plates, the Artwork Generator offers a number of distinct advantages over conventional machines.

Since the machine utilizes only three photographic plates from the original master to the final plate used against the wafer, deterioration of the photographic images is reduced to minimum. Dust cannot contaminate computer programs.

The photographic plates utilized in the machine are 4 × 5 inch and consequently offer a limited surface exposed to contamination as compared to the 8 × 10 inch plates utilized in the industry as light beam artwork generated models for first step reduction.

The circuit library is incorporated into separate plates and fingerprint contamination is reduced since once the plates have been inserted in the photography position all transfer functions are automated. During design, special emphasis has been placed on avoiding friction while the plates are transferred from one position to the next.

All moving elements of the machine and optics are totally enclosed. The only manual contact with the machine is associated with the loading and unloading of the cassette, and of the circuit library photoplate. Since magnetic hold-down of the cassette is preferably utilized, fingerprint contact is also reduced to a minimum and locking screws have been eliminated.

5. OBJECTIVE CONSIDERATIONS

The present machine utilizes the same objective throughout the total reduction process of 100×. The total reduction is made into two steps each minified 10×. In the fabrication of LSI's, this feature is most important in that throughout the mask fabrication precise repeatability of patterns across the plate is a critical requirement. By utilizing the same objective, the inherent imperfections of the objective in respect to linearity across the field are repeated and consequently no image migration results from the objective inaccuracies.

6. STORAGE SPACE

The only storage space required with the Artwork Generator and its operation is related to the storage of computer programs and of photographic plates of dimensions not exceeding 4 × 5 inches.

Depending upon the multiplicity of the user's needs in LSI circuitry, the storage of first reduction artwork masters, of the subsequent step reductions with contact prints and of the final master photomasks becomes substantial. Storage cabinets must be dust-proof. The temperature of the storage room should be uniform, and the humidity should be controlled. Substantial savings are realized with the 610-211 approach in both storage and cataloging of the master photomask supplies.

The program tapes can be stored in conventional tape bins while minimum space is required to store the small photographic masters.

PHOTORESIST CAPABILITIES OF THE ARTWORK GENERATOR

Discrete wiring on wafers may be necessary when alterations must be incorporated on the LSI circuits during fabrication.

This phase requires the introduction in the Artwork Generator of an aperture and of the generation of a specific program for line interconnection based upon the specific model to be incorporated on the circuit.

The present apparatus is preferably provided with a special flash power supply, an interchangeable optical assembly, and with an ultraviolet objective. It is best to use the variable aperture generator with the photoresist system in order to reduce absorption through glass master. In this case, the photoplate used in the circuit library is removed and the variable aperture generator is programmed from the computer to generate lines or dots on the wafer or on photoresist coated chrome masks.

The circuit library photoplate alignment capability of the system is ± 0.0005 inch. In this instance the reduction of 10X is achieved only once on the wafer. For instance, an image of 0.010 inch aperture will produce a line of 0.001 inch on the photoresist covered wafer. The accuracy and repeatability position of the line generated according to this aperture is on the wafer: ± 0.0005/10 = ± 0.00005 inch. This corresponds to a positioning accuracy of ± 1¼ micron. This repeatability and accuracy is, of course, 10 times lesser than the accuracy reached when utilizing the double reduction 100X process. It is, however, satisfactory for most of the interconnection problems as related to the LSI wafer. It allows for the connection of a 1 micron wide line on a pad having, for instance, a 5 micron diameter.

The source utilized to operate in the optimum spectrum response of photoresist materials, as available from Shipley or Kodak, lies in the ultraviolet spectrum. An ultraviolet source capable of delivering several thousand watts is mounted vertically into a chamber. Air forced cooling is utilized. In some applications requiring long duty cycles, water cooling of the electrodes may also be incorporated. A reflector, an IR rejection band pass filter, and a series of quartz condenser lenses are utilized with the system.

Conjugates, lens mounting, are compatible with the standard artwork generator. The lens is, however, changed to operate in the ultraviolet. The focusing plane of the objective is readjusted through the means of the focus control to the ultraviolet operational range before projecting images.

Depending upon the geometries, the width of the lines to be reproduced onto the wafer, the exposure duration may range from a fraction of a second to several seconds. Accordingly, photoresist exposures are not performed "on the fly." The fully automated X—Y servo system is utilized to immobilize the wafers during exposure.

PHOTORESIST OBJECTIVE

The Artwork Generator is preferably provided with a unique objective lens capable to operate in the ultraviolet spectrum. The objective has the following characteristics:

| | |
|---|---|
| Focal Length: | 28 millimeters |
| Minification: | 10X |
| Object to Image Distance: | 315 millimeters - equal to standard 10X objective |
| Object Size: | 1.600" × 1.600" |
| Resolution: | In excess of 650 lines per millimeter. |

Considering optimum conditions with optimum photoresist material, resolution in the order of 800 lines per millimeter can be attained with this objective.

PHOTORESIST CASSETTES

Both the 4 × 5 inch cassette and the 2½ × 2½ inch cassette may be utilized with the photoresist system. By removing the work table from the machine in a special adapter to mount silicon wafers can be used. This adapter and available standard wafer holding fixtures are not incorporated in this technical description.

ENVIRONMENTAL CONSIDERATIONS

The Artwork Generator should be operated in a Class 100 Clean Room. It is recommended that the room temperature be maintained in a range of from 68° to 72° F. and with a variation not exceeding ± 1° F. Control of humidity is not critical. Variations from a 40 percent nominal of ± 10 percent are acceptable.

The control of dust particles in the air is mandatory since particles introduced in the optical path result in pin holse or line breaks, or show as inclusions on the photographic plates. This is particularly important when working with photomasks having sub-micron geometries.

Most clean rooms do not compensate for barometric pressure variations. Automatic barometric control is preferably incorporated in the Artwork Generator, such as illustrated in application Ser. No. 594,213, filed Nov. 18, 1966 for Correction Computer.

We claim:

1. Microcircuit art generating means comprising,
a stable base,
a precision X and Y coordinate table movably mounted on said base,
means connected to drive said table,
X and Y interfereometer means mounted on said base and adapted to measure the X and Y coordinate positions of said table and table mounting,
means to mount a photographic plate on said table,
a microflasher projector mounted on said base over said table, and master aperture reticle means mounted under said projector,
said master aperture reticle means comprising an aperture plate having a plurality of different size and shape apertures and driven means connected to said aperture reticle means to select one of said apertures, variable aperture plate means and place said one aperture on the optical axis of said projector.

2. Apparatus as in claim 1 having X—Y control servo motor means to position said variable aperture generator.

3. Apparatus as in claim 1 having X—Y control servo motor means connected to said interferometer means and adapted to locate the X and Y coordinates of said table.

4. Apparatus as in claim 3 having means to provide output signals at predetermined coordinate positions.

5. Apparatus as in claim 1 wherein said master aperture reticle means comprises a library aperture plate, and a variable aperture generator.

6. Apparatus as in claim 5 wherein said variable aperture generator comprises a first pair of plates movable in a first direction and a second pair of plates movable in a second direction at 90° to first direction.

7. Apparatus as in claim 6 wherein said variable aperture generator is rotatably adjustable.

8. In a microflash projector apparatus of the type having X and Y table means for positioning a photographic plate mounted on said table, and first positioning means for positioning said X and Y table means;
means to generate micro circuit art on said photographic plate comprising,
circuit library aperture means having a plurality of apertures, second positioning means to position said aperture means to project particular images, program control means to control said first and second positioning means to position said X and Y table means and said circuit library aperture means to photographically generate predetermined apertures on said photographic plate, and variable aperture plate means mounted on the optical axis of said projector.

9. Apparatus as in claim 8 having variable aperture plate means mounted on the optical axis of said projector.

10. Apparatus as in claim 8 wherein said program control means controls said variable aperture means.

* * * * *